E. RIVETT.
SCREW COMPENSATING DEVICE FOR LATHES.
APPLICATION FILED JUNE 26, 1911.
1,045,890.
Patented Dec. 3, 1912.
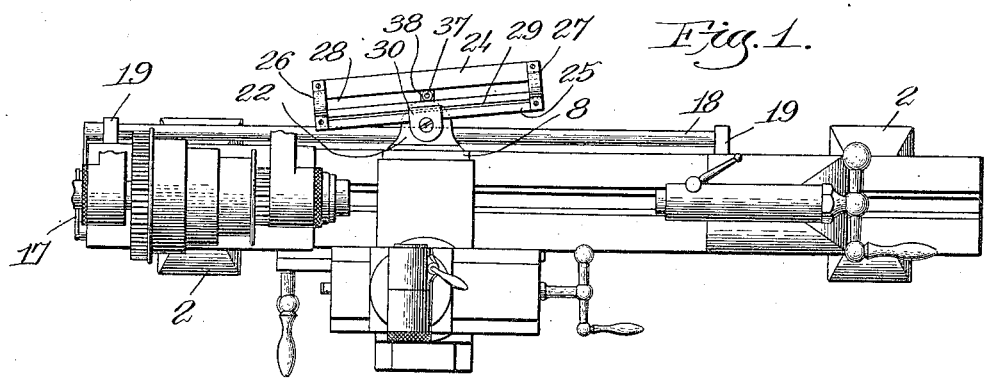
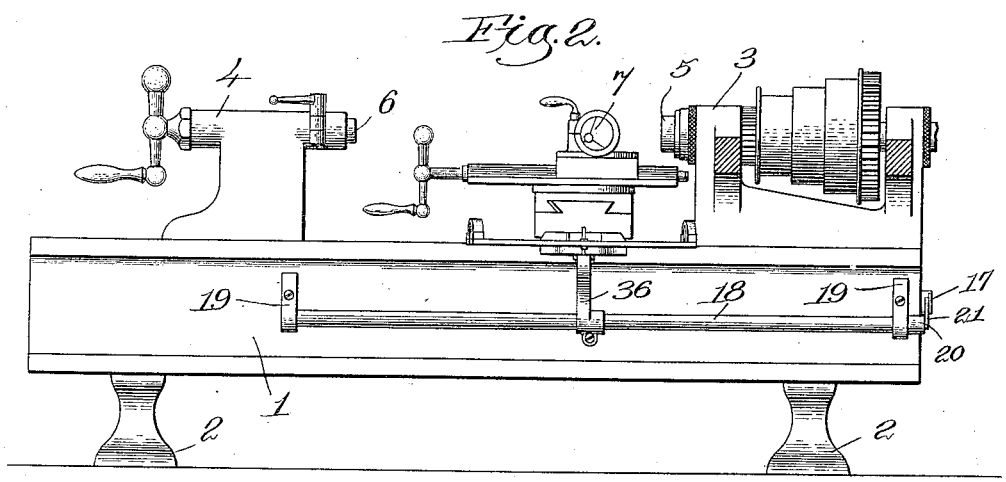
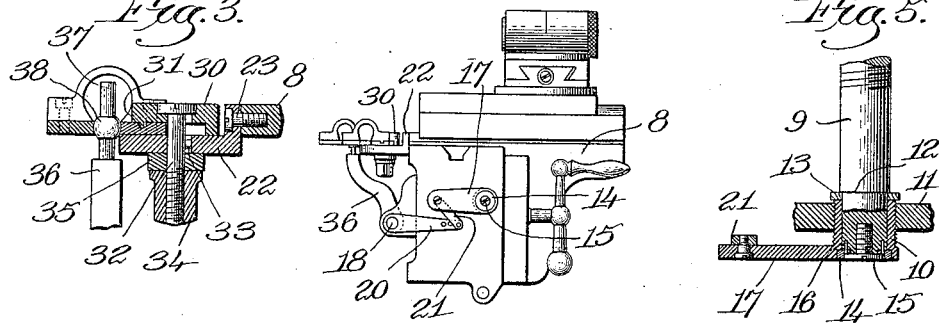
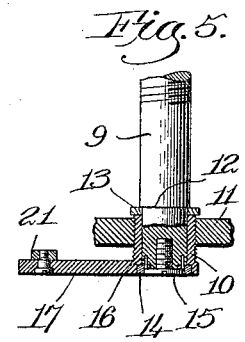
Witnesses:
Thomas J. Drummond
Warren O'Neil
Inventor.
Edward Rivett,
by Edwards Heard & Smith
attys.

UNITED STATES PATENT OFFICE.

EDWARD RIVETT, OF BRIGHTON, MASSACHUSETTS, ASSIGNOR TO RIVETT LATHE & GRINDER COMPANY, OF BRIGHTON, MASSACHUSETTS, A CORPORATION OF MASSACHUSETTS.

SCREW COMPENSATING DEVICE FOR LATHES.

1,045,890. Specification of Letters Patent. Patented Dec. 3, 1912.

Application filed June 26, 1911. Serial No. 635,279.

*To all whom it may concern:*

Be it known that I, EDWARD RIVETT, a citizen of the United States, and resident of Brighton, county of Suffolk, State of Massachusetts, have invented an Improvement in Screw Compensating Devices for Lathes, of which the following description, in connection with the accompanying drawing, is a specification, like characters on the drawing representing like parts.

This invention has for its object the provision of means whereby the feed in a lathe may be automatically controlled to compensate for the changes in temperature.

It has been found that changes in temperature have a material effect upon the accuracy of work done in a lathe designed for a very fine and accurate character of work. This is especially true in the cutting of screw threads. If a part of the work be performed, for example, on a certain day, and a temperature change takes place before the work is completed, the work cannot be continued with the same accuracy unless compensation is made in some way for the expansion or contraction due to the temperature change.

The present invention provides mechanism adapted to be embodied in any ordinary form of lathe, whereby these objections may be overcome, and accuracy of work insured despite the changes in temperature.

The drawings represent an ordinary type of lathe, the preferred form of mechanism embodied in this invention shown in connection therewith.

The nature of the invention will more fully appear from the accompanying description and drawings, and will be particularly pointed out in the claims.

In the drawings Figure 1 is a top plan view of a lathe embodying the invention. Fig. 2 is a front elevation thereof. Fig. 3 is an enlarged detail in the transverse vertical section. Fig. 4 is an end elevation of the lathe, looking toward the right of Fig. 2, and with the head stock removed. Fig. 5 is an enlarged detail chiefly in the transverse cross section.

The drawing shows a lathe of ordinary type designed for the cutting of screws in a fine and accurate manner. The construction of the lathe is not specifically involved herein, and therefore the illustration of the lathe is of a general nature and is to be regarded simply as a means for illustrating the application and use of the present invention. In the lathe illustrated, 1 is the bed of the lathe, supported upon suitable standards 2. This bed carries adjustably mounted thereon the head stock 3, and tail stock 4, provided with the rotary centering chucks 5 and 6 respectively, in which the work is held and rotated in the usual manner.

The cutting tool is mounted in a chuck or tool holder 7. This chuck or holder is mounted for various fine adjustings in various directions, upon a carriage 8, sliding longitudinally of the bed 1.

Relative longitudinal movement between the work support formed by the chucks 5 and 6, and the tool holder is secured in the present instance by a screw shaft 9, journaled in the ends of the bed 1, extending longitudinally thereof, and having threaded engagement with the carriage 8, all in a manner well known in lathe construction.

The additions to the construction to embody the present invention will now be described. A sleeve 10, is threaded into the end wall 11 of the bed 1, and the end of the shaft 9 is journaled in the sleeve 10 so as to turn freely therein, but to move bodily and longitudinally therewith. To secure the longitudinal movement of the shaft with the sleeve, the shaft is provided with a shoulder 12, and a washer 13 is seated between this shoulder and the inner end of the sleeve 10. A recess is formed in the opposite end of the sleeve, and the end of the shaft is flanged to seat in this recess, this flange being shown in the form of a washer 14, held in place by a screw 15 passing therethrough and threaded into the end of the shaft, while guide pins secure the position of the washer with respect to the shaft.

The sleeve 10 is provided with a projecting arm 17. A rock shaft 18, is journaled longitudinally in the side of the bed 1, and as shown, is mounted in the bearing blocks 19. This shaft is provided with a crank arm 20, and a link 21, adjustably connecting arms 17 and 20. This adjustment enables any variation in the relative movement of the arm 26, hereinafter referred to, and the arm 17 to be substantially compensated for. It will be seen, therefore, that by rocking the shaft 18, the sleeve 10 will be rotated in one or the other direction, and consequently given a slight longitudinal movement in the bed, thus giving a similar slight longitudinal bodily movement to the screw shaft 9.

A horizontal bracket 22 is secured to the end of the tool holding carriage 8, by screws 23, and projects out laterally. A longitudinally slotted guide member is pivotally supported on this bracket, enabling it to be adjusted into a desired angular relation above and with respect to the shaft 18. This slotted guide member is composed of two parallel longitudinal plates 24 and 25, connected at their ends by arch members 26 and 27, thus presenting a longitudinal slot 28 therebetween. The plate 25 is longitudinally grooved in its top face, as shown at 29, and a clamp plate 30 extends over the plate 25, and is provided with a rib or feather 31, fitting the groove 29. The plate 25, and connected clamp plate 30, rest upon the upper face of the bracket 22, and are pivoted to the said bracket by the screw 32. A pin 33 extends from the screw 32 into a slot in the bracket 22, preventing rotation of the screw therein, and a lock nut 34, and washer 35, carried by the screw beneath the bracket 22, enables the slotted guide member to be locked in any desired angular position upon the bracket 22. The shaft 18 is provided with an arm 36, adjustably clamped thereon, and this arm projects up into the slot 28 of the slotted guide member. To secure the engagement of this arm 36 with the slot 28 without binding, the slot is formed with concaved edges, and the arm is provided with a rod 37, sliding longitudinally therein, and carrying a ball 38, engaging the concaved edges of the slot.

The operation of the device will now be apparent. When it is desired to compensate for a temperature condition requiring the feed of the tool with respect to the work in the lathe to be increased or decreased, the slotted guide member is set at such an angle with respect to the longitudinal movement as will effect the desired result. As the tool holder moves longitudinally on the lathe bed it carries with it the slotted guide member, and in doing so gives a uniform rocking movement to the lever 36, and consequently to the shaft 18, and through the connections described to the sleeve 10, thus giving a very slight uniform longitudinal movement to the screw shaft 9 in the required direction. Thus it will be seen that with great delicacy of adjustment the required minute decrease or increase in the feed may be secured to compensate for the changes caused by conditions of temperature.

Having fully described my invention what I claim as new and desire to secure by Letters Patent is:

1. A lathe comprising a work support, a tool holder, a feed screw for giving relative longitudinal movement thereto, and means for giving a pre-determined uniform bodily longitudinal movement to said screw during said relative movement.

2. A lathe comprising a bed, a work support, a tool holder, a feed screw for feeding said holder longitudinally with respect to the work support, a sleeve having threaded engagement with the bearing head, said feed screw having its bearing in said sleeve and held against the longitudinal movement therein, and connections between said tool holder and said sleeve whereby a pre-determined degree of rotation is given to said sleeve upon the longitudinal movement of the holder.

3. A lathe comprising a bed, a work support, a tool holder, a feed screw for feeding said holder with respect to said work support, a rock shaft mounted at the side of said bed, connections between said rock shaft and said feed screw to give the latter bodily longitudinal movement upon the rocking of the former, and connections between the tool holder and rock shaft to give the latter a uniform rocking movement during the travel of the former.

4. A lathe comprising a bed, a work support, a tool holder, a feed screw for feeding said holder with respect to the work support, a sleeve threaded into the bed and serving as a bearing for the feed screw, said feed screw being held against longitudinal movement with respect to the sleeve; a rock shaft at the side of the bed, a longitudinally slotted guide member adjustably pivoted to said tool holder, an arm projecting from said rock shaft into engagement with the slot of said guide member, and connections between said rock shaft and sleeve to cause the rotation of the latter from the former.

In testimony whereof, I have signed my name to this specification, in the presence of two subscribing witnesses.

EDWARD RIVETT.

Witnesses:
　Elizabeth Morris,
　Thomas J. Drummond.